April 29, 1958

C. J. MANN 2,832,601

DOUBLE-ACTING DIAPHRAGM CHUCK

Filed June 20, 1955

INVENTOR.
Charles J. Mann
BY
Attorney

April 29, 1958  C. J. MANN  2,832,601
DOUBLE-ACTING DIAPHRAGM CHUCK
Filed June 20, 1955  4 Sheets-Sheet 2

INVENTOR.
Charles J. Mann
BY
Attorney

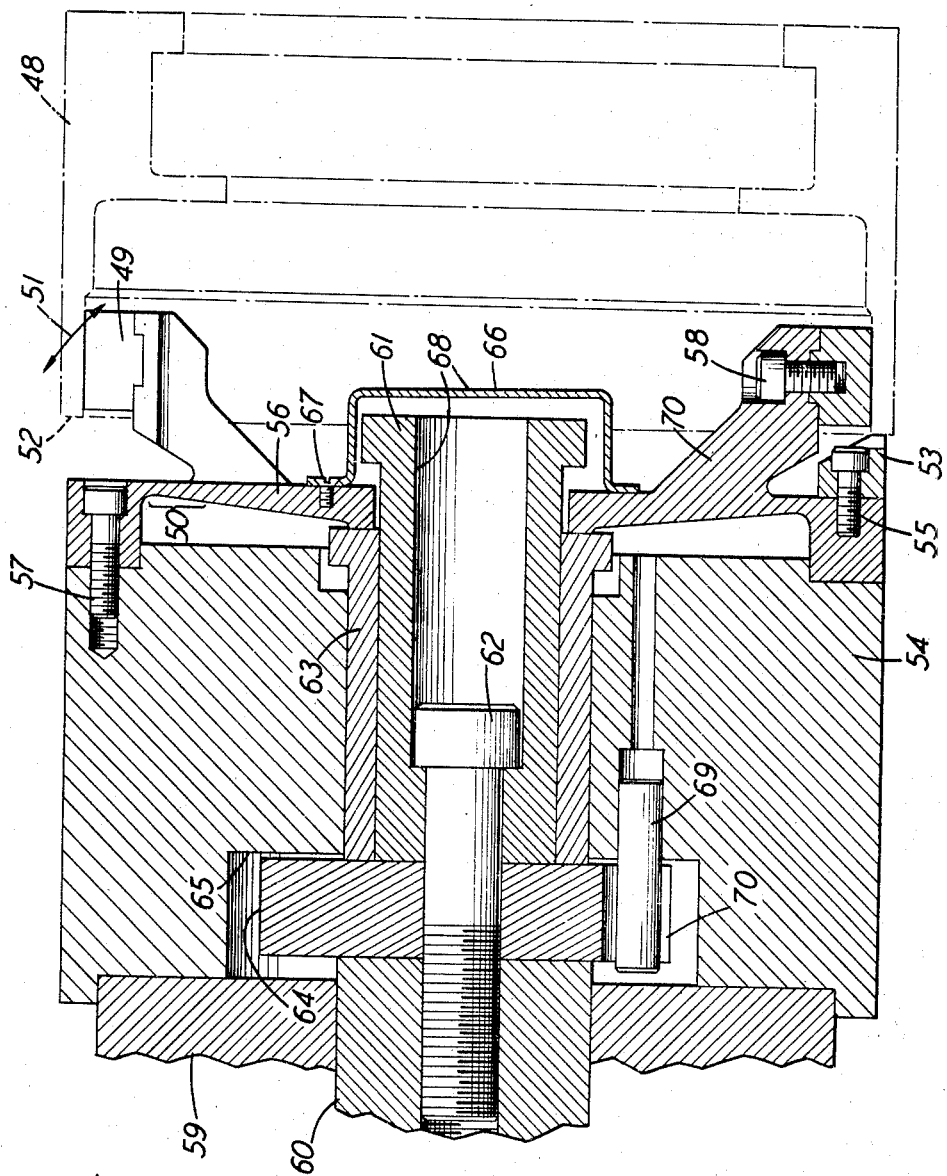

April 29, 1958     C. J. MANN     2,832,601
DOUBLE-ACTING DIAPHRAGM CHUCK
Filed June 20, 1955     4 Sheets-Sheet 4
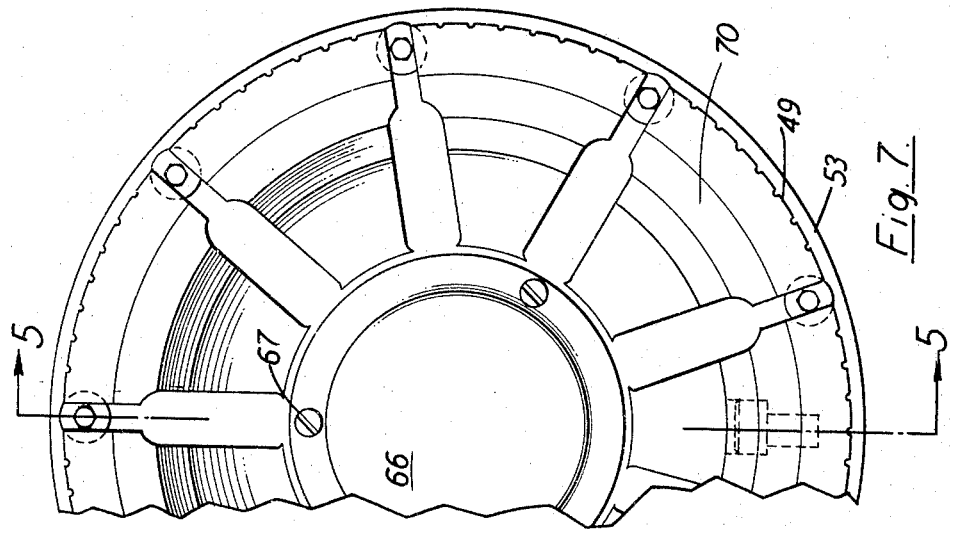
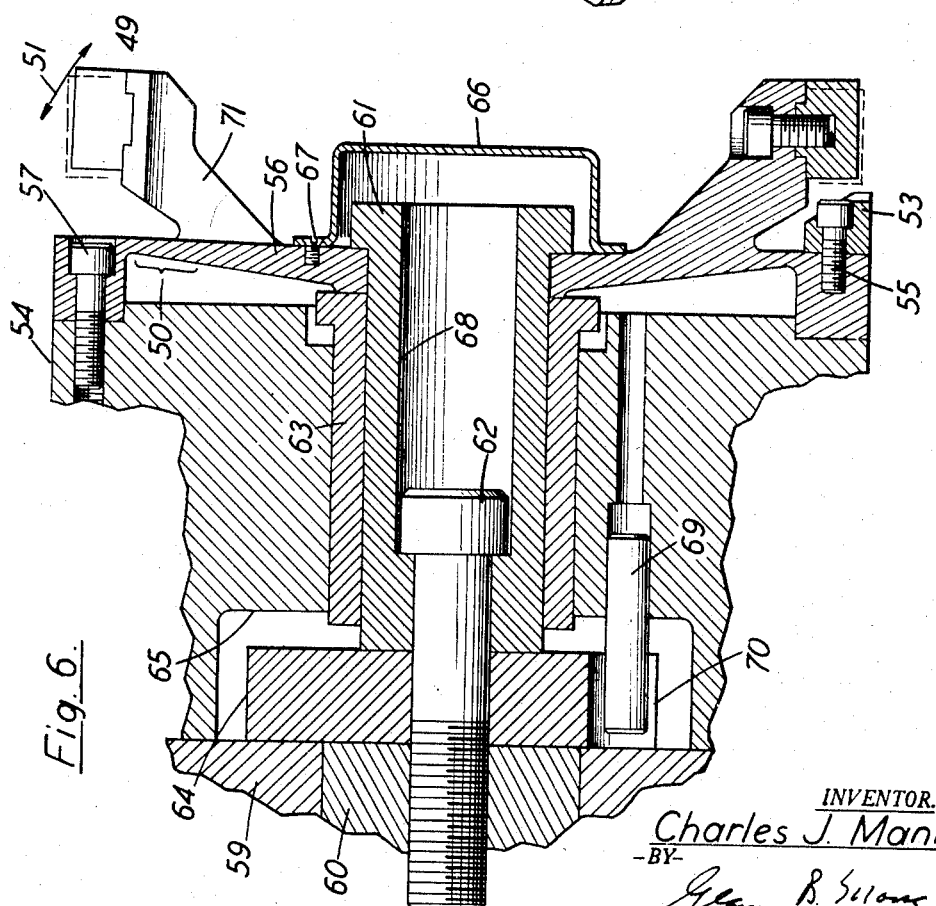
INVENTOR.
Charles J. Mann
BY
Attorney

2,832,601

DOUBLE-ACTING DIAPHRAGM CHUCK

Charles J. Mann, Traverse City, Mich.

Application June 20, 1955, Serial No. 516,699

5 Claims. (Cl. 279—2)

This invention relates to the construction of diaphragm chucks. These devices are ordinarily mounted on the spindle of a rotary machine such as a lathe, and are used when the machine is devoted to a production run of a large number of pieces having closely-similar dimensions. The amount of opening and closing movement of a diaphragm chuck is very limited, and is usually just about sufficient to properly engage and disengage a series of essentially similar pieces. While the amount of actuation of a chuck of this type is small, its principal advantage is the rapidity and accuracy with which it can be shifted from open to closed position. The principal structural characteristic of a diaphragm chuck is the mounting of a series of jaws on a flexible diaphragm plate. The jaws are normally angularly spaced about the axis of rotation, and the application of force from the rear to the central portion of the flexible diaphragm plate will deflect the plate outwardly and result in the opening movement of the jaws, when the jaws are formed to grip on the outside diameter of a work piece. Conversely, when the jaws are formed to grip an inside diameter, outward deflection of the diaphragm plate will cause the jaws to grip the surface which they engage. Normally, release of the actuating force permits the resiliency of the diaphragm to move the jaws back to a smaller circumscribed diameter.

It has been the accepted practice to apply actuating force to a diaphragm in but one axial direction, leaving the resilience of the diaphragm to take care of movement of the jaws in the opposite direction. In this invention, actuating force is applied to the diaphragm in opposite directions, so that power is applied both to the opening and closing movements. With this arrangement, substantially twice the total diaphragm deflection is made available for jaw movement, since the diaphragm is caused to deflect on either side of a neutral position approximately the same amount. In addition to this feature, this invention provides for the location of the jaw members at particular positions with respect to the flexible diaphragm member such that the closing movement of the jaws induces not only a gripping action but a small degree of axial movement of the gripped work piece as the jaws come solidly into engagement. This characteristic, when coupled with the provision of abutments limiting the axial movement of the work piece with respect to the chuck, causes the work pieces to come solidly into a fixed position so as to eliminate to a large extent the accumulations of tolerance caused by variations in position of work pieces within the chuck. The value of the axial movement of the work piece during the chucking operation becomes fully realized when the double-action diaphragm actuation system is used. When the closing movement of the chuck is controlled by power rather than merely leaving it to the resilience of the diaphragm, a much greater degree of force can be brought to bear over the entire gripping operation, and such force will not be dependent primarily upon the amount of deflection of the diaphragm. The uniformity obtainable through the application of power in both opening and closing movements makes it possible to bring the work pieces down solidly against the work stops to insure positive alignment of the work pieces under all circumstances.

The several features of the invention will be discussed in detail through an analysis of the particular embodiments illustrated in the accompanying drawings. In the drawings:

Figure 1 presents a front elevation of a chuck constructed according to this invention.

Figure 5 presents a modified form of the chuck (with jaws formed to grip on an inside diameter).

Figure 6 illustrates the operating positions of the chuck illustrated in Figure 5.

Figure 7 is a front elevation of the chuck illustrated in Figures 5 and 6. Figure 5 is taken on the plane 5—5 of Figure 7.

The chuck illustrated in Figures 1 to 4, inclusive, is mounted on the spindle 10 of a lathe, and is held in engagement therewith by a series of bolts, one of these being indicated at 11. The spindle 10 is tubular in form, and contains within it a conventional actuating rod 12 which is caused to move axially to induce opening and closing of the chuck. The mechanism (not shown) responsible for moving the actuating rod 12 is conventional, and forms no part of this invention.

Figure 1:
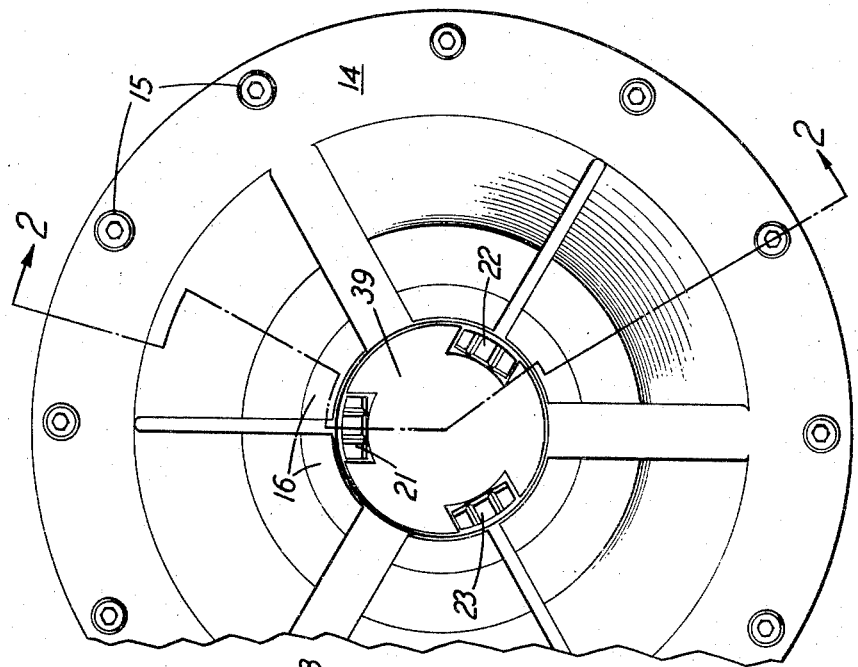
Figure 2:
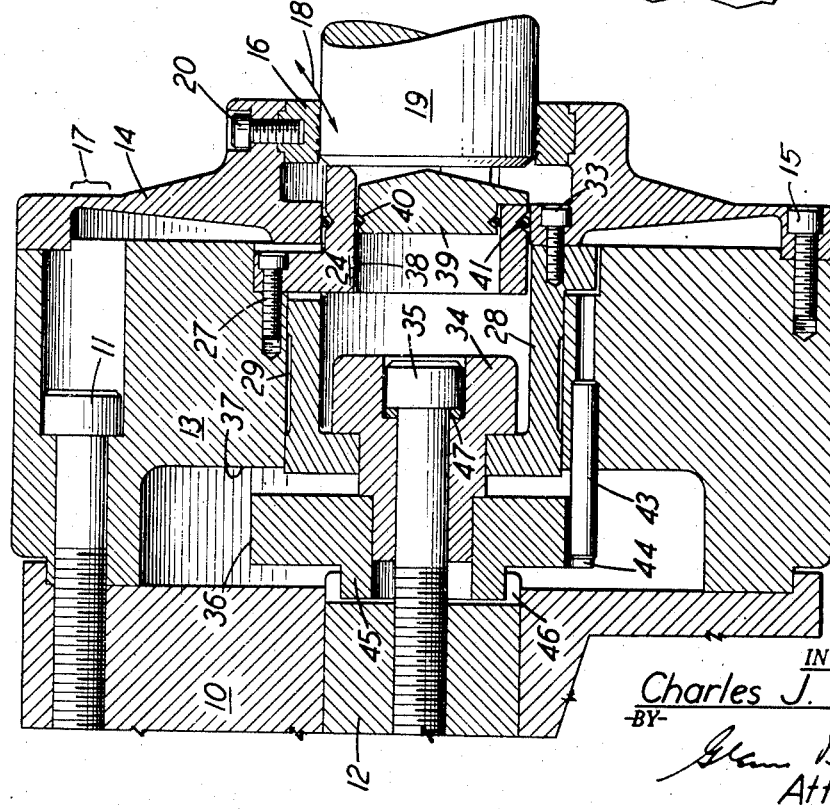
Figure 2 is a section taken on a plane 2—2 of Figure 1.
Figure 3:
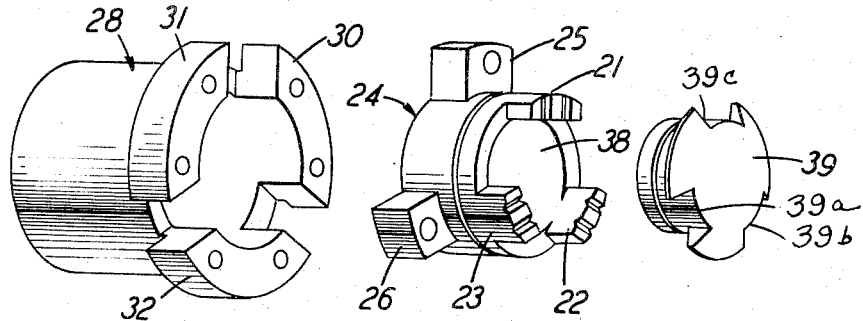
Figure 3 is an exploded view showing three components of the actuating mechanism.
Figure 4:
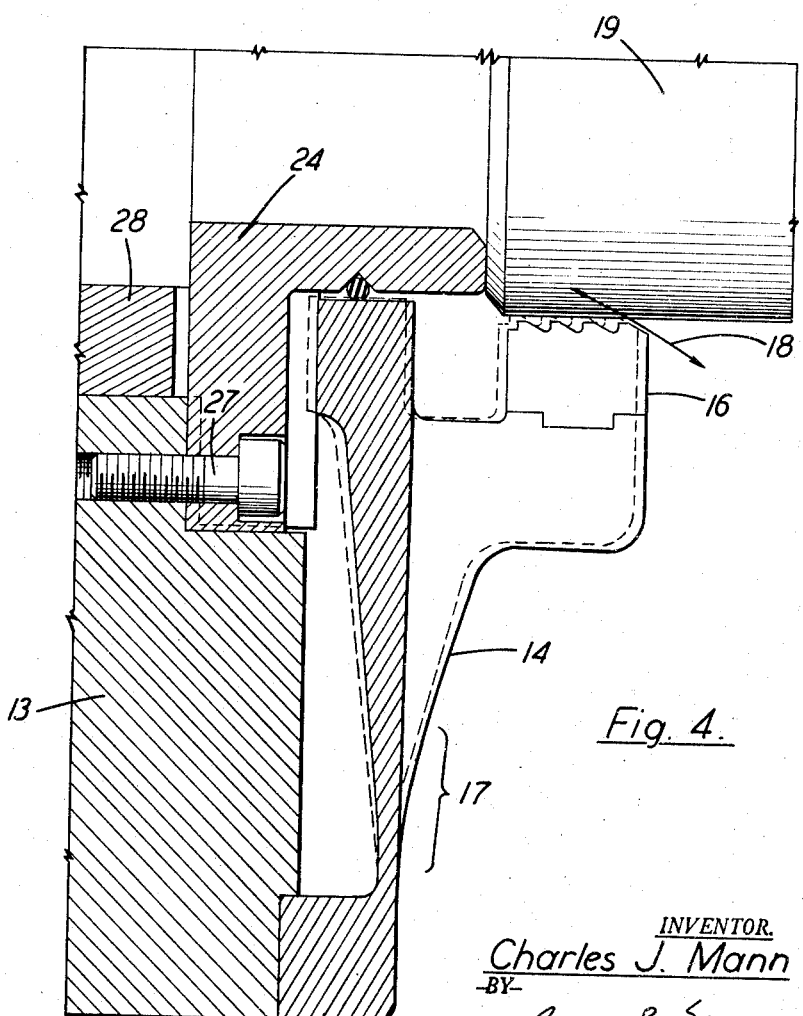
Figure 4 illustrates the operating positions of the chuck shown in Figures 1 and 2.

The chuck itself includes a frame member 13 and a diaphragm member 14 secured to the frame 13 by bolts as indicated at 15. The flexibility of the diaphragm member 14 permits a considerable amount of deflection in response to forces applied at the central area of the diaphragm, and outward deflection (to the right, as shown in Figure 2) will result in increasing the inscribed diameter of the bearing surfaces of the jaws 16. The deflection of the diaphragm 14 is principally centered in an annular area indicated by the bracket 17, and movement of the jaws 16 may be considered as an arcuate swing about a center located generally within the area 17. The direction of this movement is indicated by the arrow 18, and it will be observed that such movement not only tends to bring the jaw 16 into close engagement with the work piece 19, but also tends to move the work piece to the left. The jaws themselves are normally hardened inserts secured to the structure of the diaphragm 14 by screws as indicated at 20.

The diaphragm 14 has a central opening through which the three axially-extending fingers 21, 22, and 23 of the work stop 24 extend. This piece has three radially-extending lugs, two of which are shown at 25 and 26, which are secured to the frame 13 by screws as indicated at 27 in Figure 2. The outer extremities of the fingers 21, 22, and 23 are hardened and are preferably serrated as shown to provide effective and wear-resistant reference surfaces against which the work piece 19 can be solidly aligned.

The forces which are brought to bear to control the diaphragm 14 are applied through the medium of the cup-shaped actuating member 28 mounted for sliding axial movement within the bore 29 of the frame 13. The open end of the cup-shaped actuating member 28 is provided with a flange having three segments, as shown at 30, 31, and 32 in Figure 3. The openings between these flanges accommodate the lugs 25 and 26 (and the third lug not shown in Figure 3) of the work stop 24. The flanges 30, 31, and 32 are fastened to the diaphragm 14 at the central portion thereof by screws as indicated at 33 in Figure 2. Axial movement of the cup-shaped member 28 will therefore induce similar movement of the central portion of the diaphragm 14.

Inward movement of the cup-shaped member (to the left, as viewed in Figure 2) is obtained through the action of the plug 34, the head of which bears against the bottom of the cup-shaped member 28. A bolt 35 traverses the plane of the bottom of the cup, and connects the plug 34 with the actuating rod 12, so that movement of the actuating rod 12 to the left is transferred to the central area of the diaphragm 14. Movement of the actuating rod 12 to the right causes movement of the pusher plate 36 to the point where it comes into engagement with the bottom of the cup-shaped member 28, and continuing movement brings it into co-planar relationship with the inwardly-facing shoulder surface 37 of the frame 13. Such movement applied to the diaphragm 14 will swing the jaws 16 into release position.

A bore 38 is provided in the work stop 24 to provide access to the head of the bolt 35, and a plug 39 is preferably positioned as shown to seal off the bore 38 to prevent ingress of foreign material. Preferably, sealing rings as indicated at 40 and 41 are also used to more effectively close off the openings. The plug 39 is notched around its periphery as indicated at 39a, 39b and 39c to accommodate the fingers 21, 22, and 23.

To assure non-rotative relationship between the actuating rod 12, the pusher 36, and the frame 13, a pin 43 is positioned to engage a notch 44 in the periphery of the pusher plate 36. Additionally, a key 45 remains in engagement with the diametral slot 46 in the end of the actuating rod 12. This arrangement assures the maintenance of the adjusted angular relationship of the bolt 35 and the actuating rod 12, and a lock washer 47 under the head of the bolt 35 may be used, if desired.

Referring to Figures 5, 6, and 7, a modified form of the invention is illustrated in which the jaws of the chuck are formed to engage the inside diameter of a work piece indicated at 48. The engaging surfaces of the jaws 49 are so positioned with respect to the area of principal deflection indicated at 50 as to create an arcuate movement in the general direction of the arrows 51. As the jaws 49 come into engagement with the work piece 48, the movement indicated by the arrows 51 not only involves outward radial movement, but also a movement to the left as shown in Figure 5 which brings the end 52 of the work piece 48 into engagement with the work stops 53 secured to the frame 54 by screws as indicated at 55. As in the previously-described modification, the jaws 49 are essentially in the form of hardened inserts secured to the structure of the diaphragm 56, which is fastened to the frame 54 by screws 57. The jaw inserts themselves are held in position through screws as shown at 58.

The frame 54 of the chuck shown in Figures 5 to 7, inclusive, is mounted on the spindle 59 which carries the reciprocating actuating rod 60. Movement to the left of the rod 60 is communicated to the diaphragm 56 through the cup-shaped member 61, the outer flange of which comes into abutting engagement with the central area of the diaphragm 56 during such movement. As in the previous modification, a bolt 62 traverses the bottom of the cup 61, and secures it to the actuating rod 60.

Movement to the right of the actuating rod 60 is communicated to the diaphragm through the annular member 63 driven by the pusher plate 64. The outer face of the member 63 comes into engagement with the central area of the diaphragm on the inside, and the engagement of the forward surface of the pusher plate 64 with the surface 65 of the frame serves as a stop to limit this movement and thereby avoid damage to the structure of the diaphragm, as in the case of the previously-described modification. A cover 66 is secured to the diaphragm with screws as indicated at 67 to close the bore 68 provided for access to the head of the bolt 62.

As in the previous modification of the invention, a pin 69 engages the slot 70 in the periphery of the pusher plate 64 to prevent rotation of the pusher plate with respect to the frame 54 and the other components. Figure 6 illustrates the chuck in the release position, with the actuating rod 60 moved to its extreme position to the left (with the pusher plate 64 in engagement with the face of the spindle 59 and acting as a limit stop). The gripping position of the chuck is shown in dotted lines in Figure 6, and the comparison of the gripping and release positions will indicate the general movement of the jaw members 49 not only in a radial but also in an axial direction as the chuck comes into engagement with work pieces. It should be kept in mind that the projecting arms 71 do not partake substantially of the diaphragm deflection, and act only as supporting brackets for the jaws 49. This of course applies to the previous modification of the invention as well.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A diaphragm chuck for a machine having a rotative tubular spindle mounted on an axis of rotation and an actuating rod mounted within said spindle, said chuck comprising: a frame having a central axial bore and an inwardly-facing shoulder therein, and means for securing said frame to said spindle; means secured to said frame providing abutments limiting axial movement of workpieces axially approaching said frame; a flexible diaphragm member mounted on said frame transversely to said axis, said diaphragm member having jaws disposed on said diaphragm member to generate movement of gripped articles toward said abutment means as said jaws engage said articles; and actuating means for inducing axial movement of the central portion of said diaphragm member with respect to said frame, said actuating means including a cup member slideably mounted in said bore, said cup member engaging said diaphragm member at the open end of said cup member and having a central hole in the bottom thereof, said actuating means also including a member traversing said central hole and connecting said cup member to said actuating rod whereby said actuating rod is capable of applying a pulling action on the central portion of said diaphragm member, and including a pusher plate interposed between the bottom of said cup member and a surface fixed with respect to said frame, said pusher plate being secured to said actuating rod and moveable axially therewith between said fixed surface and said frame shoulder.

2. A diaphragm chuck for a machine having a rotative tubular spindle mounted on an axis of rotation and an actuating rod mounted within said spindle, said chuck comprising: a frame having a central axial bore and means for securing said frame to said spindle; means secured to said frame providing abutments limiting axial movement of workpieces axially approaching said frame; a flexible diaphragm member mounted on said frame transversely to said axis, said diaphragm member having jaws disposed on said diaphragm member to generate movement of gripped articles toward said abutment means as said jaws engage said articles; and actuating means for inducing axial movement of the central portion of said diaphragm member with respect to said frame, in axially opposite directions, said actuating means including a cup member slideably mounted in said bore, said cup member having axially-extending portions overlapping portions of said abutments and engaging said diaphragm member at the open end of said cup member and having a central hole in the bottom thereof, said actuating means also including a member traversing said central hole and connecting said cup member to said actuating rod whereby said actuating rod is capable of applying a pulling action on the central portion of said diaphragm member.

3. A diaphragm chuck for a machine having a rotative tubular spindle mounted on an axis of rotation and an actuating rod mounted within said spindle, said chuck comprising: a frame; means for securing said frame to said spindle; means secured to said frame providing abutment members limiting axial movement of workpieces axially approaching said frame; a flexible diaphragm member having a central axial opening and mounted on said frame transversely to said axis, said abutment members extending axially through said central diaphragm opening, and said diaphragm member having jaws disposed on said diaphragm member to generate movement of gripped articles toward said abutment members as said jaws engage said articles; and actuating means for inducing axial movement of the central portion of said diaphragm member with respect to said frame alternatively in axially opposite directions.

4. A diaphragm chuck for a machine having a rotative tubular spindle mounted on an axis of rotation and an actuating rod mounted within said spindle, said chuck comprising: a frame having means for securing said frame to said spindle; means secured to said frame providing abutments limiting axial movement of workpieces axially approaching said frame; a flexible diaphragm member mounted on said frame transversely to said axis, said diaphragm member having jaws disposed on said diaphragm member to generate movement of gripped articles toward said abutment means as said jaws engage said articles; and actuating means for inducing axial movement of the central portion of said diaphragm member with respect to said frame, alternatively in axially opposite directions.

5. A diaphragm chuck for a machine having a rotative tubular spindle mounted on an axis of rotation and an actuating rod mounted within said spindle, said chuck comprising: a frame having means for securing said frame to said spindle; means secured to said frame providing abutments limiting axial movement of workpieces axially approaching said frame; a flexible diaphragm member mounted on said frame transversely to said axis, said diaphragm member having jaws disposed on said diaphragm member to generate movement of gripped articles toward said abutment means as said jaws engage said workpieces; and actuating means for inducing axial movement of the central portion of said diaphragm member with respect to said frame in a direction to move said jaws to gripping position.

References Cited in the file of this patent

UNITED STATES PATENTS

| 1,827,415 | Bidwell | Oct. 13, 1931 |
| 1,985,446 | Gorman | Dec. 25, 1934 |
| 2,413,068 | Pyne | Dec. 24, 1946 |